United States Patent
Shinoda et al.

(10) Patent No.: US 10,175,676 B2
(45) Date of Patent: Jan. 8, 2019

(54) SERVOMOTOR CONTROLLER, SERVOMOTOR CONTROL METHOD, AND COMPUTER-READABLE RECORDING MEDIUM

(71) Applicant: FANUC CORPORATION, Minamitsuru-gun, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/825,650

(22) Filed: Nov. 29, 2017

(65) Prior Publication Data
US 2018/0157236 A1 Jun. 7, 2018

(30) Foreign Application Priority Data
Dec. 1, 2016 (JP) .................. 2016-234232

(51) Int. Cl.
*G05D 3/12* (2006.01)
*G05B 19/404* (2006.01)
(Continued)

(52) U.S. Cl.
CPC ....... *G05B 19/404* (2013.01); *F16H 61/0202* (2013.01); *G05B 11/011* (2013.01);
(Continued)

(58) Field of Classification Search
CPC ....... G05D 3/12; G05B 19/404; G05B 11/011
See application file for complete search history.

(56) References Cited

U.S. PATENT DOCUMENTS 5,418,439 A * 5/1995 Whang ................. G05B 19/231
318/560
5,513,114 A * 4/1996 Matsumoto .......... G05B 19/404
318/626
(Continued)

FOREIGN PATENT DOCUMENTS

JP      8-110808       4/1996
JP    2002-297241    10/2002
(Continued)

OTHER PUBLICATIONS

Decision to Grant a Patent dated Jun. 19, 2018 in corresponding Japanese Application No. 2016-234232 (with English translation).

*Primary Examiner* — Bentsu Ro
(74) *Attorney, Agent, or Firm* — Wenderoth, Lind & Ponack, L.L.P.

(57) ABSTRACT

A servomotor controller includes a connection mechanism configured to transfer power of a servomotor to a driven body; a motor control unit configured to control the servomotor using a position command value; a first force estimation unit configured to estimate a first force estimated value which is a drive force acting on the driven body at a connecting unit with the connection mechanism; a second force estimation unit configured to estimate a second force estimated value serving as a fixed value; a selection unit configured to compare an absolute value of the first force estimated value and an absolute value of the second force estimated value to output the first or second force estimated value having the larger absolute value; and a compensation amount generation unit configured to generate a compensation amount for compensating the position command value on the basis of the first or second force estimated value.

17 Claims, 14 Drawing Sheets

(51) Int. Cl.
 *G05B 11/01* (2006.01)
 *F16H 61/02* (2006.01)
(52) U.S. Cl.
 CPC ............... *G05B 2219/41129* (2013.01); *G05B 2219/41138* (2013.01); *G05B 2219/41164* (2013.01)

(56) References Cited

U.S. PATENT DOCUMENTS

| | | | | |
|---|---|---|---|---|
| 6,252,368 B1 * | 6/2001 | Sugie | ................... | G05B 19/404 318/568.22 |
| 7,319,909 B2 * | 1/2008 | Ishikawa | ................ | G05B 19/19 318/560 |
| 8,896,255 B2 | 11/2014 | Iwashita et al. | | |
| 9,448,545 B2 | 9/2016 | Iwashita et al. | | |
| 2003/0184252 A1 * | 10/2003 | Takamune | ........... | G05B 19/404 318/632 |
| 2013/0320908 A1 | 12/2013 | Iwashita et al. | | |
| 2014/0121818 A1 | 5/2014 | Iwashita et al. | | |
| 2014/0156080 A1 | 6/2014 | Iwashita et al. | | |

FOREIGN PATENT DOCUMENTS

| | | |
|---|---|---|
| JP | 2014-13554 | 1/2014 |
| JP | 2014-87880 | 5/2014 |
| JP | 2014-109785 | 6/2014 |
| JP | 2018-60333 | 4/2018 |

\* cited by examiner

SERVOMOTOR CONTROLLER, SERVOMOTOR CONTROL METHOD, AND COMPUTER-READABLE RECORDING MEDIUM

This application is based on and claims the benefit of priority from Japanese Patent Application No. 2016-234232, filed on 1 Dec. 2016, the content of which is incorporated herein by reference.

BACKGROUND OF THE INVENTION

Field of the Invention

The present invention relates to a servomotor controller having a function of compensating the position of a driven body that is driven by the power of a servomotor, a servomotor control method, and a computer-readable recording medium.

Related Art

Conventionally, servomotor controllers have been known which install a workpiece (work) on a table, and cause the table to move via a connection mechanism by a servomotor. The table and workpiece are driven bodies. The connection mechanism has a coupling which is connected to the motor servo, and a ball screw which is fixed to the coupling. The ball screw is threaded to a nut. In one of such servomotor controllers, there is a servomotor controller having a function of compensating the position of a driven body (referred to as mobile body) that is driven by the power of the servomotor.

A servomotor controller disclosed in Patent Document 1 estimates a drive force acting on a driven body at a connecting unit of the connection mechanism, and compensates a position command value based on the estimated drive force. A servomotor controller disclosed in Patent Document 2 calculates a stretch/contraction amount of the ball screw from a distance from the servomotor to the mobile body, and a torque command value, and calculates a position compensation amount for the mobile body threaded to the ball screw from this stretch/contraction amount, and compensates the position command value according to this position compensation amount. A servomotor controller disclosed in Patent Document 3 calculates an stretch/contraction amount of a ball screw based on a tension acting on a distal side of the ball screw from the servomotor, a distance between a pair of fixing units supporting the ball screw at both ends, a distance from the fixing unit provided at a proximal side of the servomotor to a movable body, and a torque command given to the servomotor, and calculates a position compensation amount for a feed shaft based on the calculated stretch/contraction amount of the ball screw.

Patent Document 1: Japanese Unexamined Patent Application, Publication No. 2014-109785
Patent Document 2: Japanese Unexamined Patent Application, Publication No. 2014-13554
Patent Document 3: Japanese Unexamined Patent Application, Publication No. 2014-87880

SUMMARY OF THE INVENTION

The present inventors have found that, in the case of compensating the position command value, during a stop state or a low-speed operation state, a compensation reacting to an estimated drive force unrelated to mechanical operation is added to the position command value, whereby oscillation of the compensation amount arises. The present invention has an object of providing a servomotor controller for a machine tool or industrial machine capable of position control of a driven body with higher precision, a servomotor control method, and a computer-readable recording medium.

(1) A servomotor controller according to the present invention includes: a servomotor;
a driven body configured to be driven by the servomotor;
a connection mechanism configured to connect the servomotor and the driven body and transfer power of the servomotor to the driven body;
a position command generation unit configured to generate a position command value for the driven body;
a motor control unit configured to control the servomotor using the position command value;
a first force estimation unit configured to estimate a first force estimated value which is a drive force acting on the driven body at a connecting unit with the connection mechanism;
a second force estimation unit configured to estimate a second force estimated value serving as a fixed value;
a selection unit configured to compare an absolute value of the first force estimated value and an absolute value of the second force estimated value to output the first or second force estimated value having the larger absolute value; and
a compensation amount generation unit configured to generate a compensation amount for compensating the position command value generated by the position command generation unit on the basis of the first or second force estimated value output from the selection unit.

(2) In the servomotor controller according to (1), it is preferable that the compensation amount generation unit uses, as the compensation amount, a sum of a product of the first or second force estimated value output from the selection unit and a first coefficient and a product of the first or second force estimated value output from the selection unit, a distance from the servomotor to the connecting unit, and a second coefficient.

(3) in the servomotor controller according to (1) or (2), it is preferable that the second force estimated value is a value obtained by adjusting a drive force acting on the driven body to be estimated to a predetermined constant value having a sign corresponding to a direction of a position command created by the position command generation unit.

(4) in the servomotor controller according to any one of (1) to (3), it is preferable that the second force estimated value is a predetermined constant value or a fixed value of the first force estimated value estimated by the first force estimation unit when a command speed or a command acceleration of the position command created by the position command generation unit is no more than a desired value.

(5) In the servomotor controller according to any one of (1) to (4), it is preferable that the servomotor controller further includes a switching unit configured to switch its output from a value output from the selection unit to the first force estimated value estimated by the first force estimation unit when a command speed or a command acceleration of the position command value generated by the position command generation unit exceeds a desired value.

(6) In the servomotor controller according to any one of (1) to (5), it is preferable that the compensation amount generated by the compensation amount generation unit is passed through a filter when the selection unit or the switching unit switches its output from the second force estimated value to the first force estimated value or from the first force estimated value to the second force estimated value.

(7) In the servomotor controller according to any one of (1) to (6), it is preferable that the motor control unit includes a speed command creation unit and a torque command creation unit, the torque command creation unit includes an integrator that integrates at least a speed error, and the integrator is overwritten when the selection unit or the switching unit switches its output from the second force estimated value to the first force estimated value or from the first force estimated value to the second force estimated value.

(8) A servomotor control method for controlling a servomotor controller according to the present invention is a servomotor control method for controlling a servomotor controller including: a servomotor;

a driven body configured to be driven by the servomotor; and a connection mechanism configured to connect the servomotor and the driven body and transfer power of the servomotor to the driven body, the method including the steps of:

generating a position command value for the driven body; estimating a first force estimated value which is a drive force acting on the driven body at a connecting unit with the connection mechanism;

comparing an absolute value of the first force estimated value and an absolute value of the second force estimated value to select the first or second force estimated value having the larger absolute value;

compensating the generated position command value on the basis of the selected first or second force estimated value; and controlling the servomotor using the compensated position command value.

(9) In the servomotor control method according to (8), it is preferable that a position command compensation value for compensating the position command value is a sum of a product of the selected first or second force estimated value and a first coefficient and a product of the selected first or second force estimated value, a distance from the servomotor to the connecting unit, and a second coefficient.

(10) In the servomotor control method according to (8) or (9), it is preferable that the second force estimated value is a value obtained by adjusting a drive force acting on the driven body to be estimated to a predetermined constant value having a sign corresponding to a direction of a position command.

(11) In the servomotor control method according to any one of (8) to (10), it is preferable that the second force estimated value is a predetermined constant value or a fixed value of the first force estimated value estimated when a command speed or a command acceleration of the position command is no more than a desired value.

(12) In the servomotor control method according to any one of (8) to (11), it is preferable that the selected force estimated value is switched to the first force estimated value when a command speed or a command acceleration of the generated position command value exceeds a desired value.

(13) In the servomotor control method according to any one of (8) to (12), it is preferable that the compensation amount of the position command value is passed through a filter when the second force estimated value is switched to the first force estimated value or the first force estimated value is switched to the second force estimated value.

(14) In the servomotor control method according to any one of (8) to (13), it is preferable that a speed command is created using the compensated position command value, a torque command is created using the created speed command, and the servomotor is controlled using the torque command, the torque command is created using an integrator that integrates at least a speed error, and the integrator is overwritten when the second force estimated value is switched to the first force estimated value or the first force estimated value is switched to the second force estimated value.

(15) A non-transitory computer-readable recording medium encoded with a servomotor control program that causes a computer to execute servomotor control of a servomotor controller including: a servomotor;

a driven body configured to be driven by the servomotor; and a connection mechanism configured to connect the servomotor and the driven body and transfer power of the servomotor to the driven body, the program causing the computer to execute processing of:

generating a position command value for the driven body; estimating a first force estimated value which is a drive force acting on the driven body at a connecting unit with the connection mechanism;

comparing an absolute value of the first force estimated value and an absolute value of the second force estimated value to select the first or second force estimated value having the larger absolute value;

compensating the generated position command value on the basis of the selected first or second force estimated value; and controlling the servomotor using the compensated position command value.

According to the present invention, high-precision position control of a driven body becomes possible which suppresses the oscillation of a compensation amount that occurs by a compensation reacting to an estimated drive force unrelated to mechanical operation being added, even during a stop state or a low-speed operation state.

DETAILED DESCRIPTION OF THE INVENTION

Figure 1:
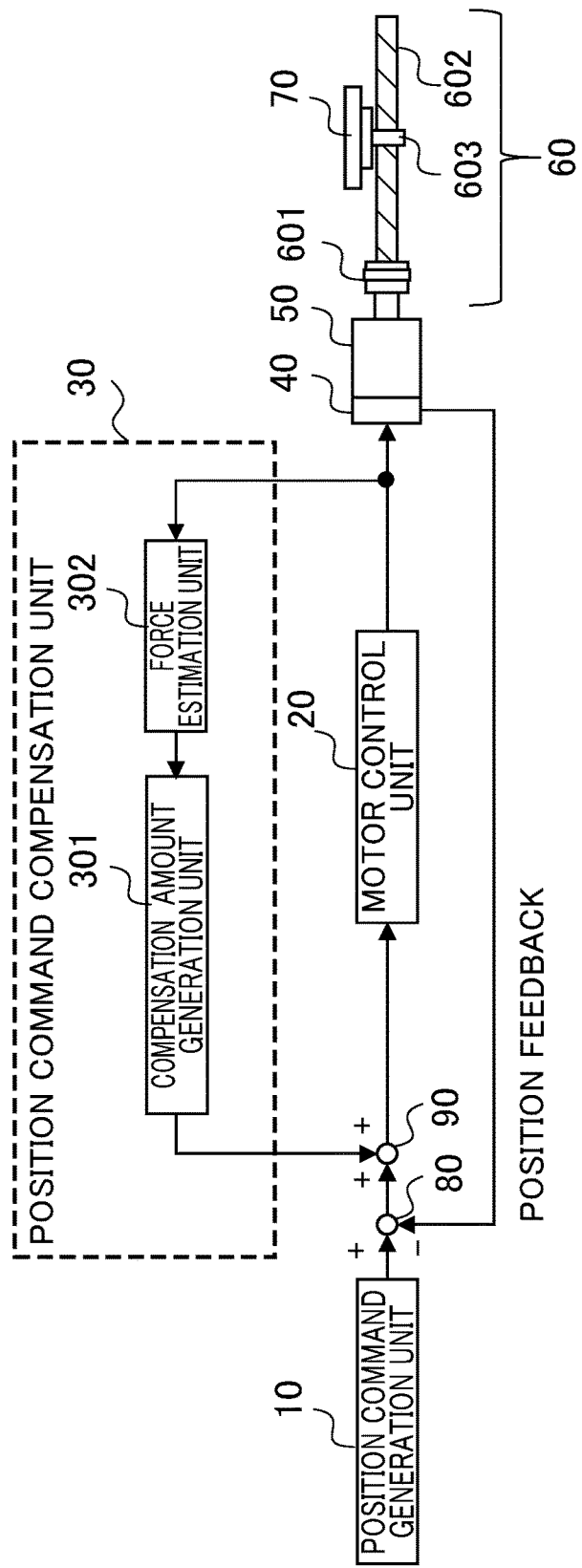
FIG. 1 is a block diagram illustrating a configuration of a servomotor controller serving as a technical premise.

Hereinafter, embodiments of the present, invention will be described using the drawings. First, a servomotor controller serving as a technical premise will be described prior to the description of the embodiments of the present invention. FIG. 1 is a block diagram illustrating a configuration of a servomotor controller serving as a technical premise. The servomotor controller rotates a servomotor 50 to move a table 70 via a connection mechanism 60 and processes a workpiece (work) mounted on the table 70. The connection mechanism 60 has a coupling 601 connected to the servomotor 50 and a ball screw 602 that is fixed to the coupling 601. A nut 603 serving as a connecting unit is threaded to the ball screw 602. By way of rotational driving of the servomotor 50, the nut 603 threaded with the ball screw 602 moves in the axial direction of the ball screw 602.

The rotation angle position of the servomotor 50 is detected by an encoder 40 associated with the servomotor 50 and serving as a position detection unit, and the detected rotation angle position (detected position value) is used as a position feedback. It should be noted that the encoder 40 is capable of detecting the rotational speed, and the detected rotational speed (detected speed value) can be used as a speed feedback. The servomotor controller has a position command creation unit 10 that creates a position command value for the servomotor 50, a subtracter 80 for obtaining a difference between the position command value created by the position command creation unit 10 and the detected position value detected by the encoder 40, an adder 90 that adds this difference and the compensation value output from the position command compensation unit 30, a motor control unit 20 that creates a torque command value for the servomotor 50 using this addition value, and a position command compensation unit 30. The position command creation unit 10 creates the position command value, following a program or instruction input from a higher-order controller or external input device, which are not illustrated.

During driving of the servomotor 50, the drive force acts on the connection mechanism 60 and the table 70, and these elastically deform. However, since the connection mechanism 60 has low rigidity compared with the table 70, the elastic deformation of the connection mechanism 60 accounts for the majority proportion of the overall elastic deformation. When the connection mechanism 60 elastically deforms, even in a case of the servomotor 50 rotating according to the command value, error in the amount of the elastic deformation amount arises in the position of the table 70. For this reason, in order to eliminate this error, the position command compensation unit 30 compensates the position command value by the amount of the elastic deformation of the connection mechanism 60. The elastic deformation amount of the connection mechanism 60 is proportional to the drive force acting on the table 70 at the nut 603 serving as the connecting unit between the table 70 and the connection mechanism 60, and the drive force can be expressed by the drive torque acting on the connecting unit. The position command compensation unit 30 has a compensation amount generation unit 301 and force estimation unit 302. The force estimation unit 302 estimates the drive force (drive torque) acting on a drive body at the connecting unit using the torque command value. The compensation amount generation unit 301 generates a compensation amount for compensating the position command value generated by the position command generation unit 10 based on the drive force estimated by the force estimation unit 302, and outputs the compensation value to the adder 90.

Figure 2:
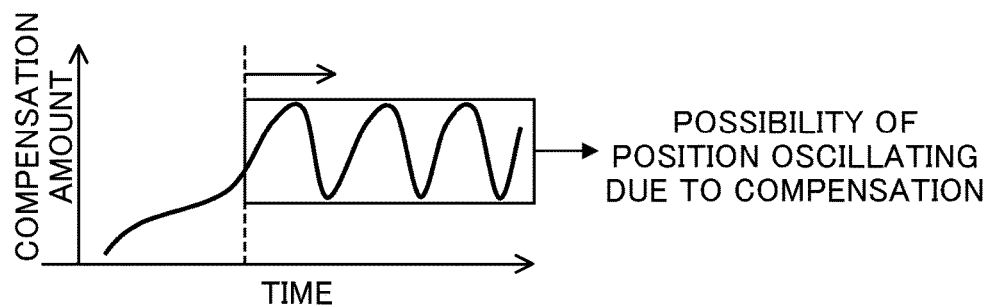
FIG. 2 is a drawing for explaining oscillation of a compensation amount.

The present inventors have found that, in a servomotor controller as the technical premise illustrated in FIG. 1, even during a stop state or a low-speed operation state, oscillation in the compensation amount may occur as illustrated in FIG. 2. The present inventors have found that the oscillation of the compensation amount can be suppressed if estimated load torque is fixed to the value of the drive force (torque) estimated by the force estimation unit 302 during a stop state or a low-speed operation state or a value determined in advance in view of the command direction.

Hereinafter, embodiments of a servomotor controller of the present invention which suppresses oscillation of the compensation amount will be described. The mechanism to which the servomotor controller of the present embodiment described below is applied is a machine tool such as a laser machine, electrical discharge machine or cutting machine; however, the servomotor controller of the present invention is applicable to industrial machinery and the like such as robots.

First Embodiment

Figure 3:
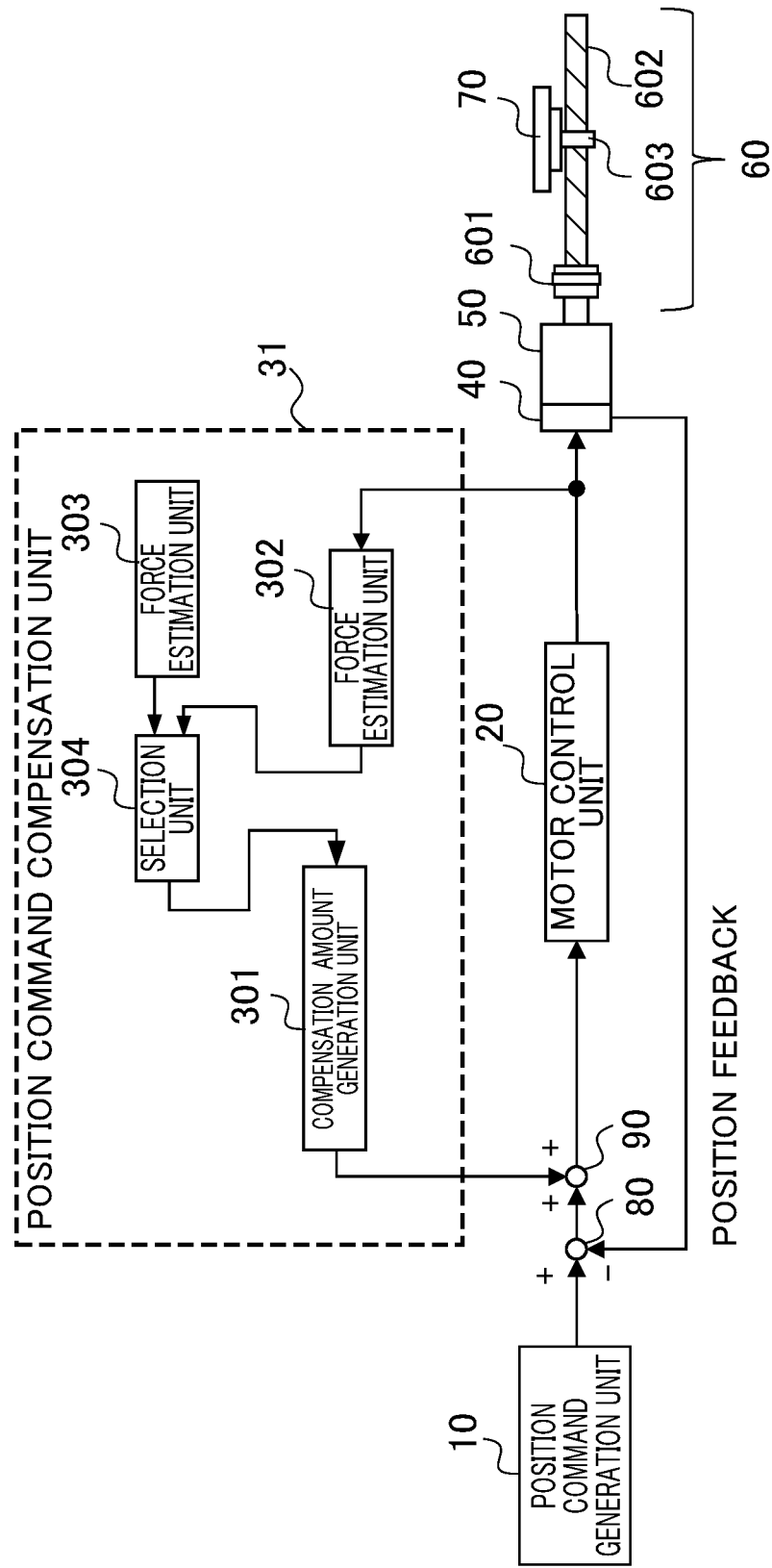
FIG. 3 is a block diagram illustrating a configuration of a servomotor controller serving as a first embodiment of the present invention.

FIG. 3 is a block diagram illustrating a configuration of a servomotor controller serving as a first embodiment of the present invention. In FIG. 3, the same constituent elements as those of the servomotor controller in FIG. 1 are denoted by the same reference symbols and the description thereof will be omitted. As illustrated in FIG. 3, in the present embodiment, a position command compensation unit 31 further includes a force estimation unit 303 and a selection unit 304 as compared to the position command compensation unit 30 illustrated in FIG. 1. As described above, the force estimation unit 302 estimates and outputs the drive force (drive torque) acting on the drive body at the connecting unit using the torque command value output from the motor control unit 20. This estimated load torque value is a first estimated value. However, the estimation of the drive force is not limited thereto, and the force estimation unit 302 may estimate the drive force by further adding acceleration/deceleration torque, disturbance torque, and the like to the torque command value, or may estimate the drive force by calculating the motor torque using the output of an electric current detection unit detecting the motor current, rather than the torque command value as disclosed in Patent Document 1 (Japanese Unexamined Patent Application, Publication No. 2014-109785).

The force estimation unit 303 may set a predetermined constant value or may set a load torque when a predetermined condition was satisfied and output the constant value or the set load torque. This constant value or the load torque is a second estimated value which is a fixed value. The predetermined constant value is mainly static frictional force applied to the drive body. The constant value is a predetermined value having a sign corresponding to the direction of the position command created by the position command generation unit 10 and basically has the value of the force corresponding to the static frictional force. The load torque when the predetermined condition was satisfied is a load torque when a command speed or a command acceleration of the position command value is no more than a desired value (for example, during a stop state of a machine). This load torque is a fixed value estimated by the force estimation unit 302 serving as the first force estimation unit.

The selection unit 304 compares an absolute value of the first estimated value output from the force estimation unit 302 and an absolute value of the second estimated value output from the force estimation unit 303 and outputs the first estimated value or the second estimated value having the larger absolute value to the compensation amount generation unit 301. As illustrated in the block diagram of FIG. 4, the selection unit 304 includes an absolute value comparing unit 3041 which receives the first estimated value output from the force estimation unit 302 and the second estimated value output from the force estimation unit 303 and compares the absolute value of the first estimated value and the absolute value of the second estimated value and a switch 3042 that switches its output between the first estimated value and the second estimated value. Depending on the comparison result, the absolute value comparing unit 3041 sends a switching signal to the switch 3042 so as to switch to the first estimated value when the absolute value of the first estimated value is the larger and switch to the second estimated value when the second estimated value is the larger.

The compensation amount, generation unit 301 generates a compensation amount on the basis of an estimated load torque output from the selection unit 304 and outputs the compensation amount to an adder 90. In this manner, the compensation value during a low load torque state is fixed to an approximately constant value.

In the present embodiment, in a low load torque state in which the absolute value of the second estimated value is smaller than the absolute value of the first estimated value, position compensation is performed according to a compensation amount calculated from the second estimated value. When the absolute value of the first estimated value is larger than the absolute value of the second estimated value, position compensation is performed according to a compensation amount calculated from the first estimated value. In a stop state or a low-speed operation state, since the load torque is basically small, the position compensation amount is clamped by the compensation amount calculated by the second estimated value and oscillation of the compensation amount is improved.

Figure 5:
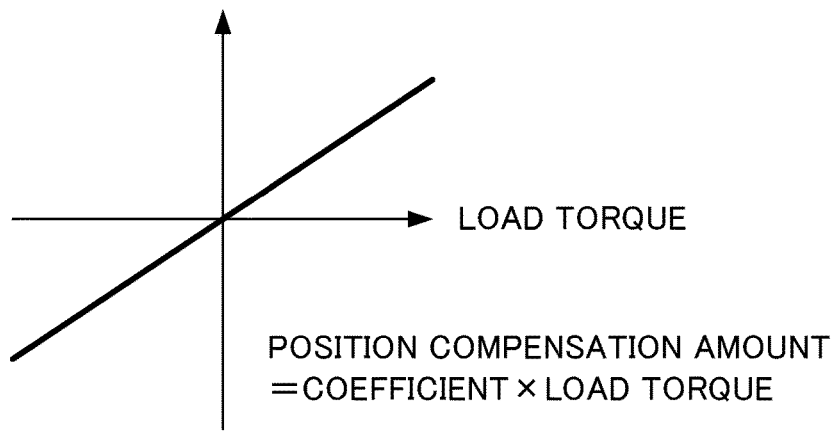
FIG. 5 is a characteristics diagram illustrating an operation of the servomotor controller illustrated in FIG. 1.

Hereinafter, the operation of the servomotor controller of the present embodiment will be described with reference to the characteristics diagrams of FIGS. 5 and 6. In the servomotor controller illustrated in FIG. 1, when the influence of the length of a ball screw is not taken into consideration, the load torque and the compensation amount are in a proportional relation as illustrated in FIG. 5, and the position compensation amount changes when the load torque is changed during stopping of commands.

Figure 6:
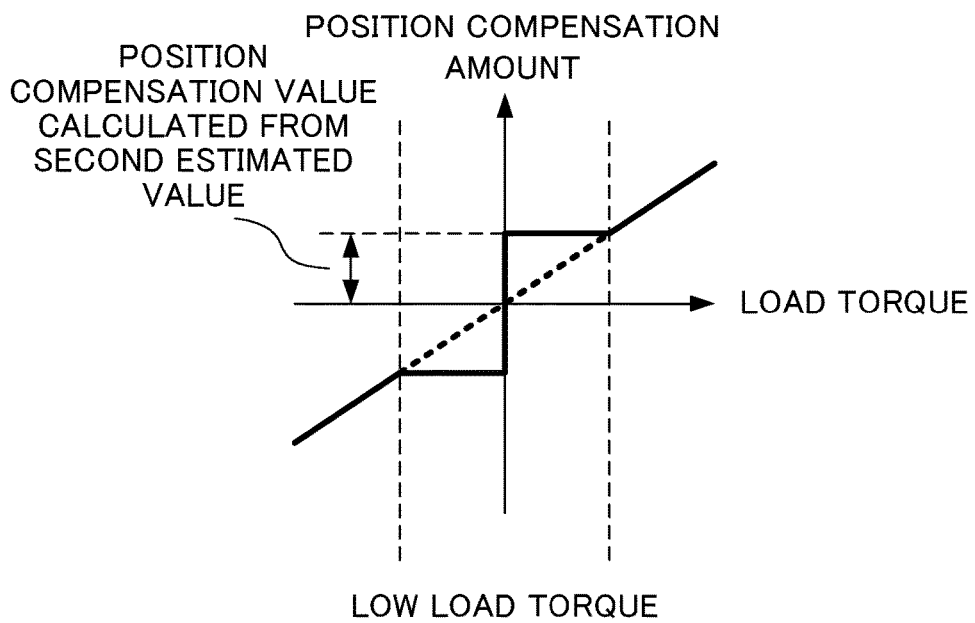
FIG. 6 is a characteristics diagram illustrating an operation of the servomotor controller illustrated in FIG. 3.

In the present embodiment, as illustrated in FIG. 6, when the absolute value of the first estimated value output from the force estimation unit 302 is smaller than the absolute value of the second estimated value output from the force estimation unit 303, the position compensation amount is constant when the influence of the length of the ball screw is not taken into consideration, and a low load torque range serves as a dead zone in which the compensation amount is not updated. Therefore, it is possible to suppress a change in the position compensation amount even when the load torque is changed during stopping of commands. In the case of an estimated load torque when the second estimated value satisfies a condition (the command speed or the command acceleration of the position command value is no more than a desired value), compensation is performed according to the characteristics (FIG. 6) indicated by a solid line determined from the estimated load torque when the condition was satisfied. The second estimated value is updated when the command speed or the command acceleration of the position command value exceeds the desired value and then becomes no more than the desired value. When the second estimated value is a predetermined constant value, compensation is performed according to the characteristics (FIG. 6) indicated by a solid line determined from the constant, value.

As described above, in the servomotor controller illustrated in FIG. 3, when the absolute value of the first estimated value is smaller than the absolute value of the second estimated value, the second estimated value serving as a fixed value is used for calculating an elastic deformation amount of the machine. By doing this, it is possible to perform only compensation on the lost motion without applying a compensation amount which is not related to the operation of the servomotor.

Figure 7:
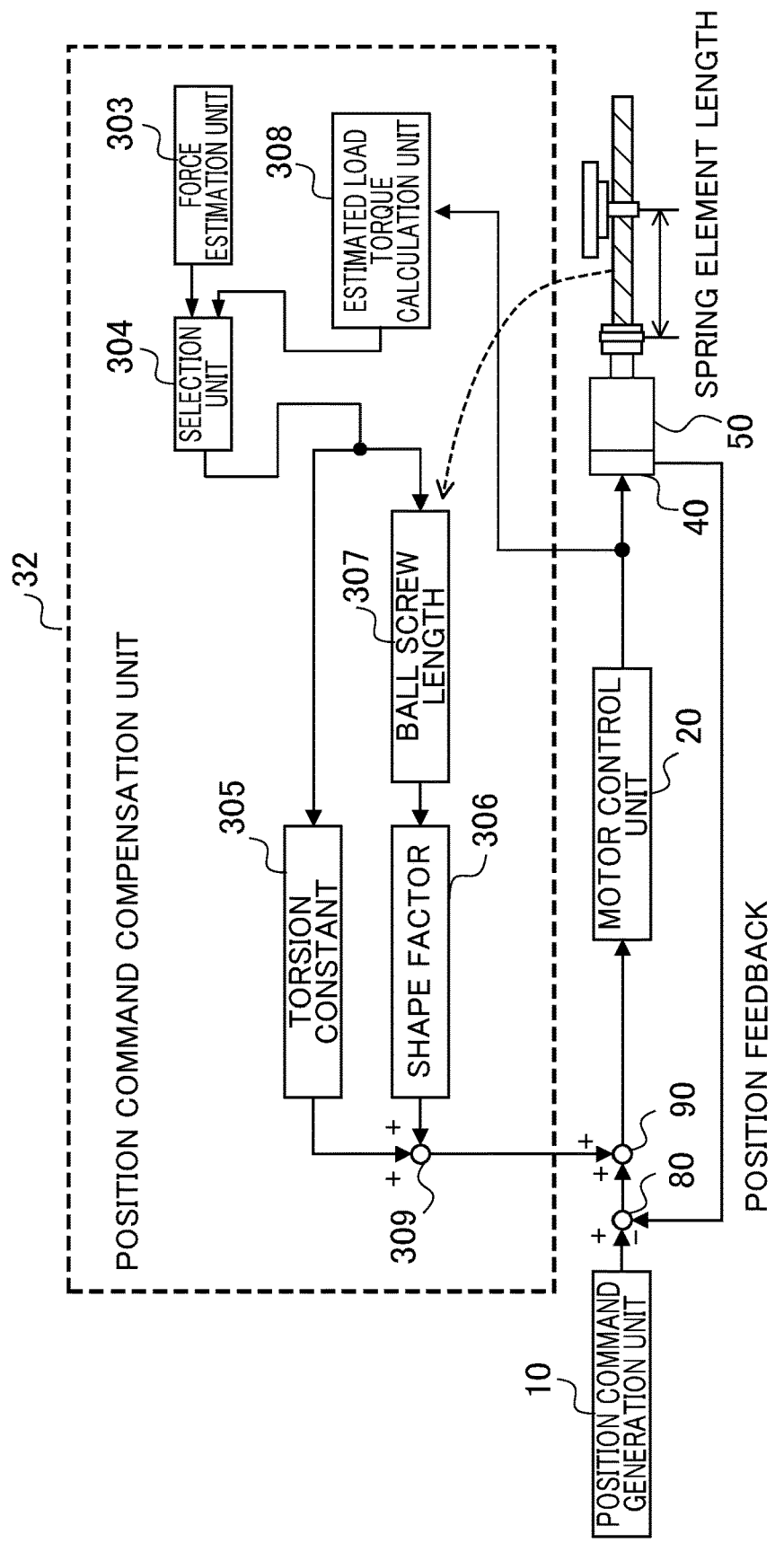
FIG. 7 is a block diagram illustrating a configuration of a servomotor controller including one configuration example of a position command compensation unit.

FIG. 7 is a block diagram illustrating a configuration of a servomotor controller including one configuration example of the position command compensation unit. The estimated load torque calculation unit 308 of the position command compensation unit 32 in FIG. 7 corresponds to the force estimation unit 302 in FIG. 3, and the torsion constant multiplying unit 305, the ball screw length multiplying unit 307, the shape factor multiplying unit 306, and the adder 309 in FIG. 7 correspond to the compensation amount generation unit 301 in FIG. 3. The shape factor indicates the stretch/contraction amount per unit length of the ball screw. In the present embodiment, the torsion constant multiplying unit 305 calculates a torsional elastic deformation around the rotation axis generated in the connection mechanism (a coupling and a ball screw), based on the estimated load torque or the second estimated value. The torsional elastic deformation around the rotation axis corresponds to the compensation amount related to the twist of the connecting unit. In addition, the ball screw length multiplying unit 307 and the shape factor multiplying unit 306 calculate the stretch/contraction elastic deformation in the axial direction based on the estimated load torque or the second estimated value. The torsional elastic deformation around the rotation axis assumes a compensation amount related to the twist of the connecting unit. Then, the adder 309 adds the torsional elastic formation around the rotation axis and the stretch/contraction elastic deformation in the axial direction, and compensates the lost motion caused by added elastic deformation in the position command value. In this example, since the first estimated value or the second estimated value on the input side of the ball screw length multiplying unit 307 is used, the position compensation amount can keep the dependency on the length of the ball screw. At this time, the elastic deformation in the axial direction depends on the distance from the servomotor to the driven body, and this distance is estimated according to the integrated value of the movement position.

When the estimated load torque is defined as T and the torsion constant is defined as α, the compensation amount related to the twist of the connecting unit, which serves as the output of the torsion constant multiplying unit 305, is α·T. When the estimated load torque is defined as T, the length of the ball screw is defined as d, and the shape factor is defined as β, the compensation amount related to the stretch/contraction of the ball screw, which serves as the output of the shape factor multiplying unit 306, is d·β·T. Then, a total compensation amount obtained by the adder 309 adding these compensation amounts is α·T+d·β·T.

Figure 8:
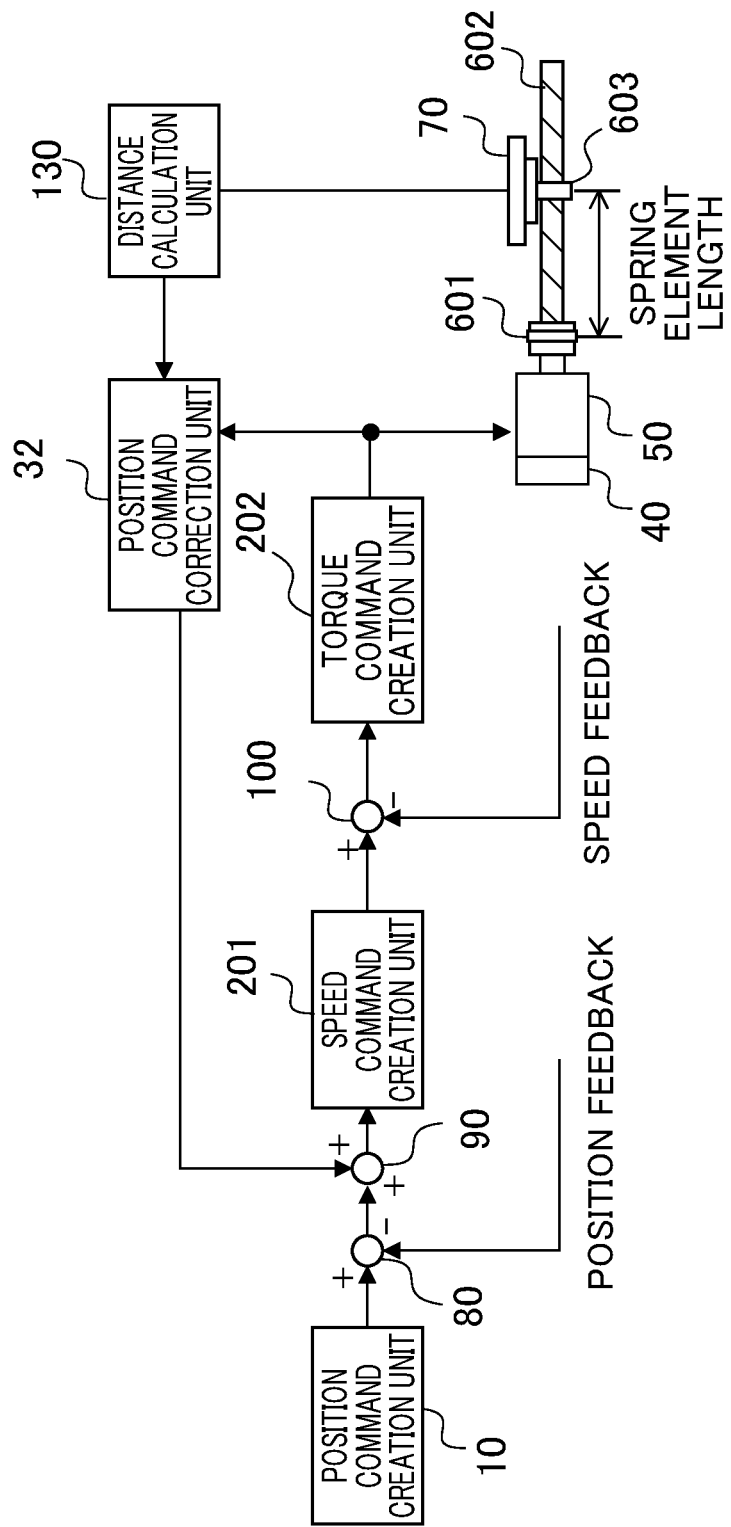
FIG. 8 is a block diagram illustrating one configuration example of a motor control unit and a configuration of a servomotor controller including a distance calculation unit that obtains the length of a ball screw (length of spring element)

FIG. 8 is a block diagram illustrating one configuration example of the motor control unit 20 and a configuration of the servomotor controller including the distance calculation unit 130 which obtains the length of the ball screw (the length of a spring element). The length of the ball screw (length of spring element) multiplied by the ball screw length multiplying unit 307 in FIG. 7 is calculated by the distance calculation unit 130. The motor control unit 20 in FIG. 7 has a speed command creation unit 201, a subtracter 100, and a torque command creation unit 202.

The predetermined constant value is basically set by measuring the force on the axis acting on the motor during a stop state of the machine. This set force, in a case of there being no disturbance (external force), corresponds to the static frictional force acting on the driven body during a stop state of the machine, and becomes a value no more than the maximum static frictional force. According to this setting, although there is some error depending on the stop state, even if estimation of the drive force is stopped and is set as the fixed value, it is possible to apply compensation corresponding to the elastic deformation amount produced due to this static frictional force during a stop state of the machine. Similarly, the predetermined constant value can be set by measuring the force on the axis acting on the motor during a low-speed operation state. Even during the stop state (or during the low-speed operation state), it is possible to reflect the change in the elastic deformation of the ball screw relative to the length of the ball screw in the compensation, by way of fixing the estimated load torque, rather than the compensation amount itself. A twist amount increases when the ball screw is long (the distance to the driven body is far), the twist amount decreases when the length is short. The compensation amount is calculated as (compensation amount)={(shape factor×ball screw length)+(torsion coefficient)}×(estimated load torque), and even if the estimated load torque is switched to the fixed value, compensation which depends on the length of the ball screw is applied. The length d of the ball screw is the length of the ball screw from the servomotor to the connection mechanism, and changes according to the position of the table.

Figure 9:
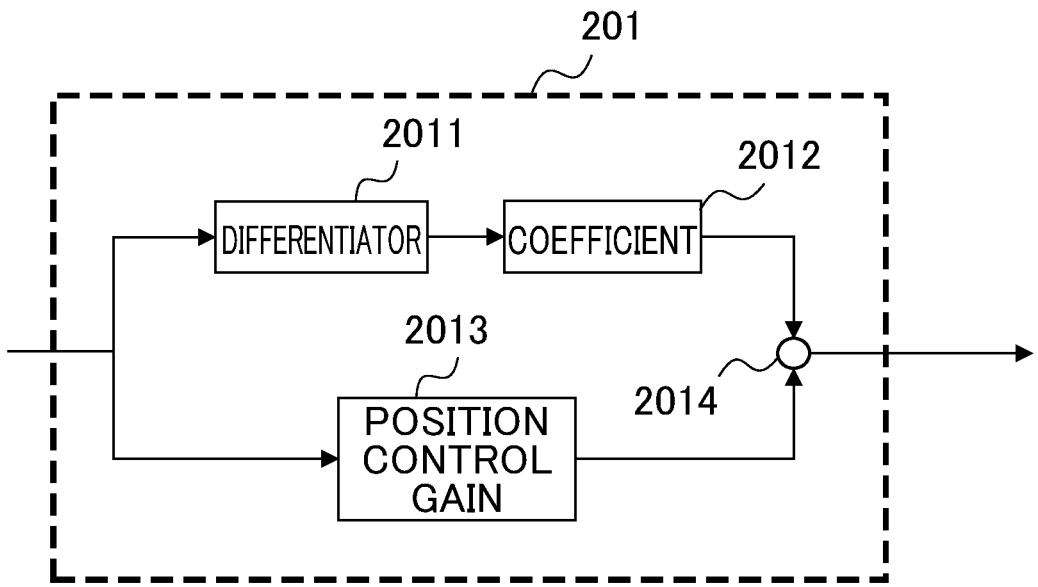
FIG. 9 is a block diagram illustrating one configuration example of a speed command creation unit.

FIG. 9 is a block diagram illustrating one configuration example of a speed command creation unit 201. As illustrated in FIG. 8, the position command creation unit 10 creates the position command value, the subtracter 80 obtains the difference between the position command value and the detected position which is position-fed back, and the adder 90 adds the compensation amount to this difference. The difference to which the compensation amount was added is input to a differentiator 2011 and a position control gain 2013 of the speed command creation unit 201 illustrated in FIG. 9. The adder 2014 outputs, as a speed command value, an addition value of the output of a coefficient unit 2012 obtained by multiplying a coefficient by the output of the differentiator 2011 and the output of the position control gain 2013. The subtracter 100 illustrated in FIG. 8 obtains the difference between the speed command value and the detected speed which is speed-fed back.

Figure 10:
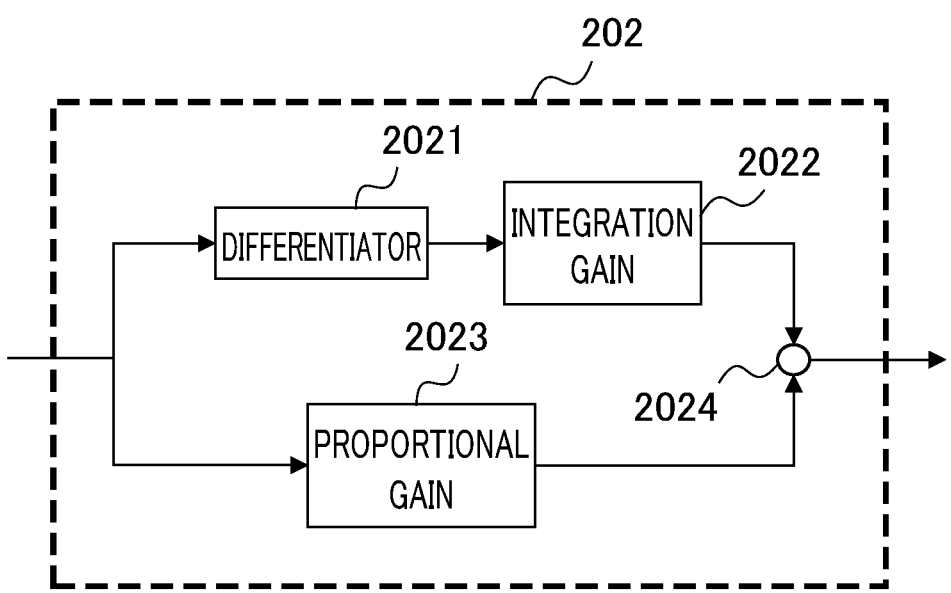
FIG. 10 is a block diagram illustrating one configuration example of a torque command creation unit.

FIG. 10 is a block diagram illustrating one configuration example of the torque command creation unit 202. The torque command creation unit 202 includes a proportional gain 2023 and an integrator 2021 connected to the subtracter 100, an integration gain 2022 connected to the integrator 2021, and an adder 2024 that adds the output of the proportional gain 2023 and the output of the integration gain 2022, and outputs to the servomotor 50 as the torque command. The integrator 2021 integrates the input. The integration gain 2022 multiplies a coefficient by the output of the integrator 2021. The proportional gain 2023 multiplies a coefficient by the input. The integration gain 2022 and integrator 2021 may be changed in arrangement sequence.

Figure 11:
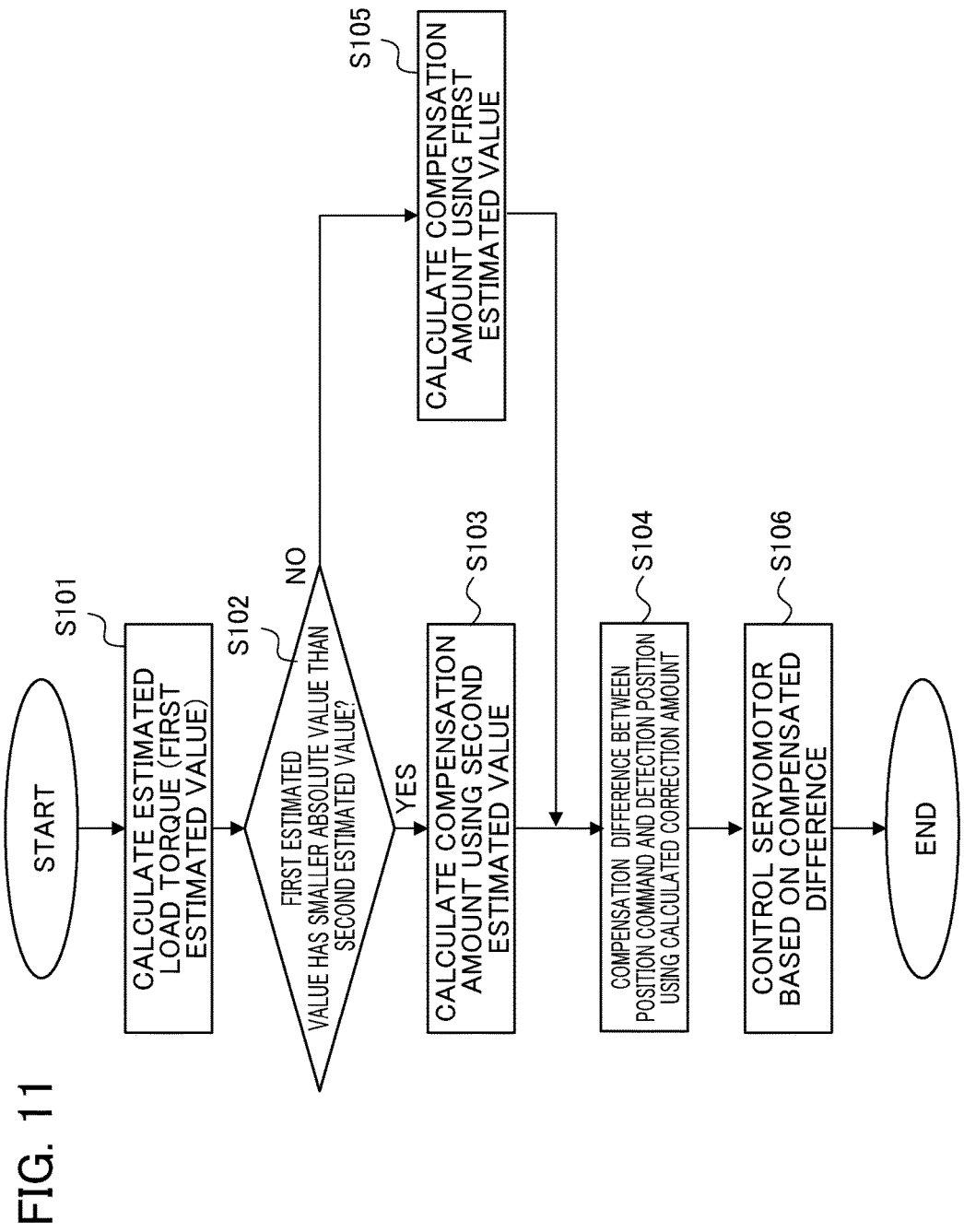
FIG. 11 is a flowchart illustrating operation of the servomotor controller illustrated in FIG. 3.

FIG. 11 is a flowchart illustrating an operation of the servomotor controller illustrated in FIG. 3. In step S101, the force estimation unit 302 calculates estimated load torque (the first estimated value). In step S102, the selection unit 304: determines whether the absolute value of the first estimated value is smaller than the absolute value of the second estimated value. When the absolute value of the first estimated value is smaller than the absolute value of the second estimated value (step S102: YES), the compensation amount generation unit 301 calculates a position compensation value using the second estimated value (step S103) and proceeds to step S104.

On the other hand, when the absolute value of the first estimated value is larger than the absolute value of the second estimated value (step S102: NO), the compensation amount generation unit 301 calculates the position compensation value using the first estimated value (step S105) and proceeds to step S104. In step S104, the subtracter 80 obtains a difference between the position command value from the position command generation unit 10 and a detected position which is position-fed back, and the adder 90 compensates the difference using the position compensation amount calculated by the compensation amount generation unit 301. Then, in Step S106, the motor control unit 20 controls the servomotor 50 based on the difference between the position command value and the detected position.

Second Embodiment

Figure 12:
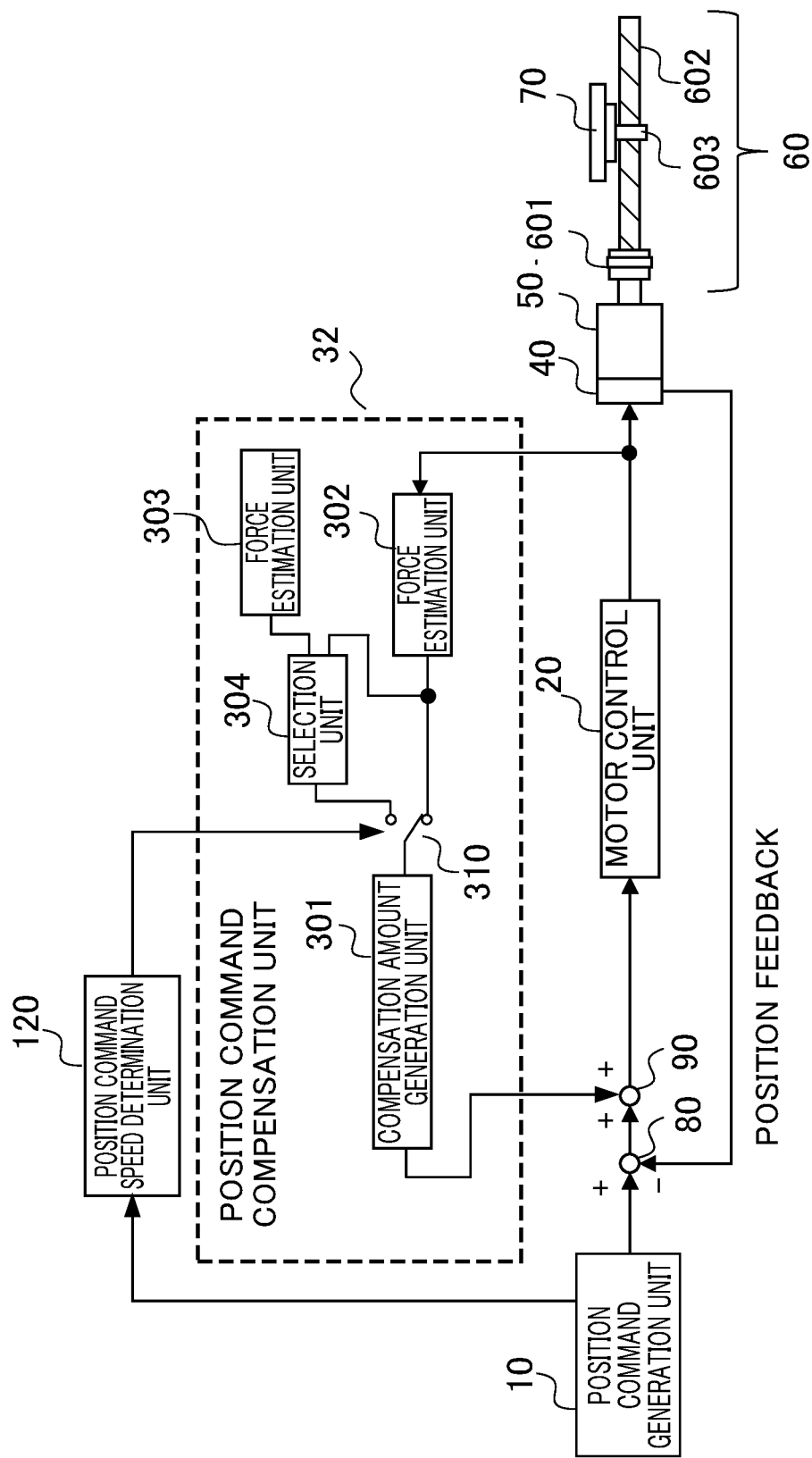
FIG. 12 is a block diagram illustrating a configuration of a servomotor controller serving as a second embodiment of the present invention.

FIG. 12 is a block diagram illustrating a configuration of a servomotor controller serving as a second embodiment of the present invention. As illustrated in FIG. 12, in a servomotor controller of the present embodiment, a position command compensation unit 32 includes a switch 310 serving as a switching unit added to the position command compensation unit 31 of the servomotor controller illustrated in FIG. 3, and the switch 310 is switched by a position command speed determination unit 120 that receives the position command value created by the position command creation unit 10 and generates a command speed of the position command value (serving as a position command speed).

When the command speed (the absolute value) is no more than a desired value (including 0), the position command speed determination unit 120 sends a switching signal to the switch 310 so that an input terminal of the compensation amount generation unit 301 is connected to an output terminal of the selection unit 304. When the command speed (the absolute value) exceeds the desired value, the position command speed determination unit 120 sends a switching signal to the switch 310 so that the input terminal of the compensation amount generation unit 301 is connected to the output terminal of the force estimation unit 302. A command acceleration of the position command value may be used instead of the command speed of the position command value. In this case, the position command speed determination unit 120 is replaced with a position command acceleration determination unit that receives the position command value created by the position command creation unit 10 to generate a command acceleration of the position command value (serving as a position command acceleration). The function of the position command acceleration determination unit is the same as the function of the position command speed determination unit 120 except that the command speed is replaced with the command acceleration. In the present embodiment, when the command speed (the absolute value) exceeds a desired value, the compensation amount is not clamped in a low load torque state.

Third Embodiment

Figure 13:
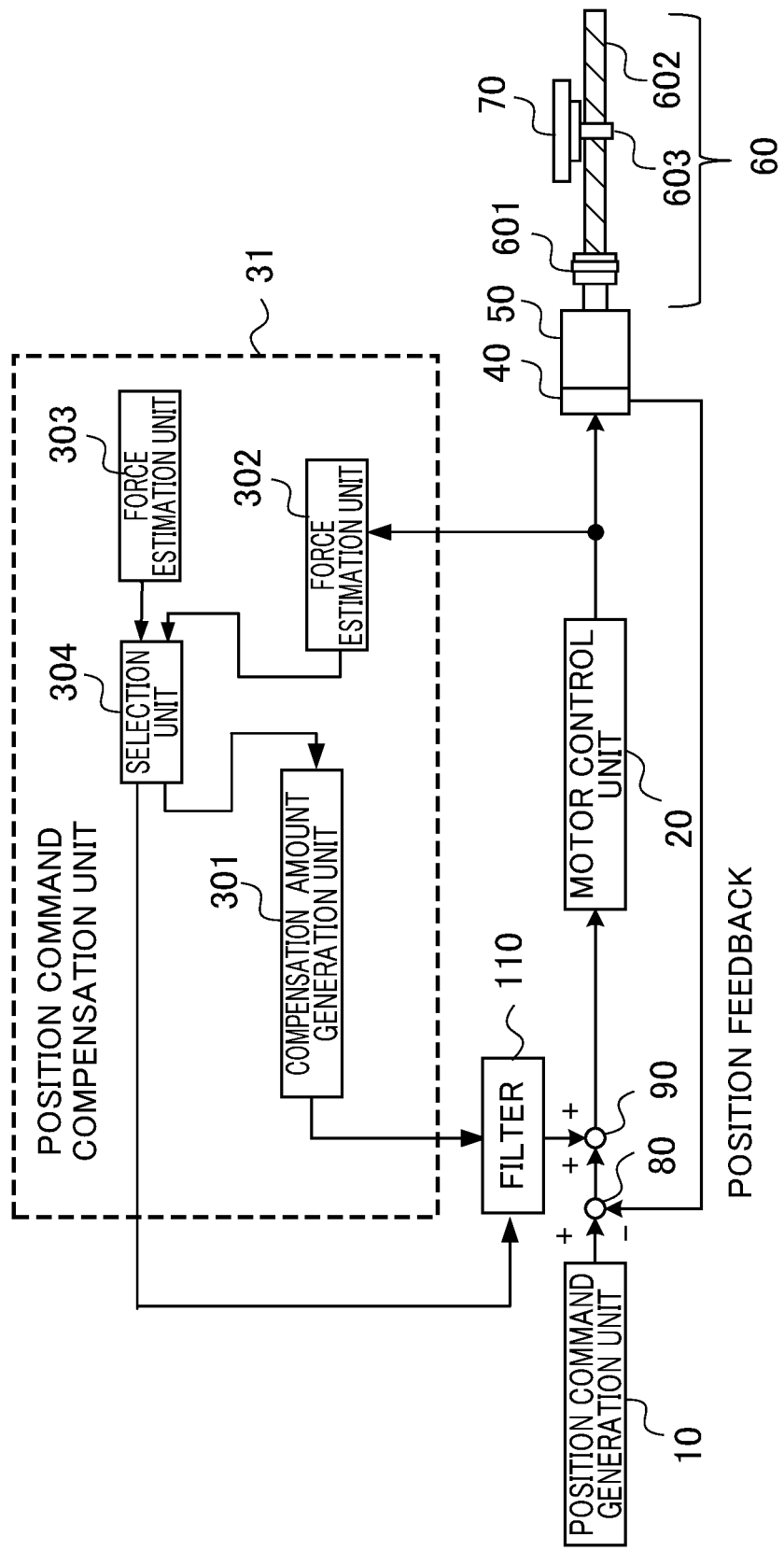
FIG. 13 is a block diagram illustrating a configuration of a servomotor controller serving as a third embodiment of the present invention.

In the servomotor controller of the first embodiment, when the selection unit 304 switches its output from the second estimated value to the first estimated value (the estimated load torque) or from the first estimated value to the second estimated value, the compensation amount may change discontinuously during switching. A discontinuous compensation amount results in a discontinuous speed command and a discontinuous torque command is generated. In order to prevent this discontinuity of the compensation amount, a filter 110 is provided on the output side of the position command compensation unit 31. When the compensation amount is passed through the filter 110, it is possible to follow a discontinuous value smoothly. FIG. 13 is a block diagram illustrating a configuration of a servomotor controller serving as a third embodiment of the present invention. The configuration of the servomotor controller of FIG. 13 is the same as the configuration of the servomotor controller in FIG. 3 except that the filter 110 is provided, and the same constituent members are denoted by the same reference symbols, and the description thereof will be omitted. The filter 110 can employ a low-pass filter.

Figure 14:
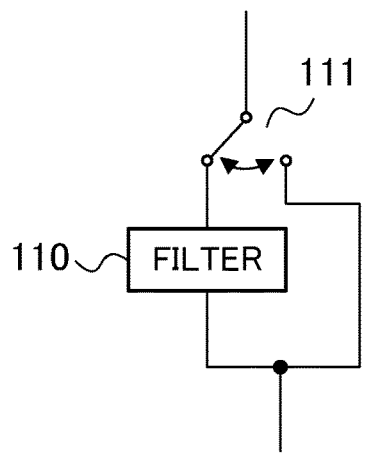
FIG. 14 is a diagram illustrating a filter and a selector switch of the filter.
Figure 15:
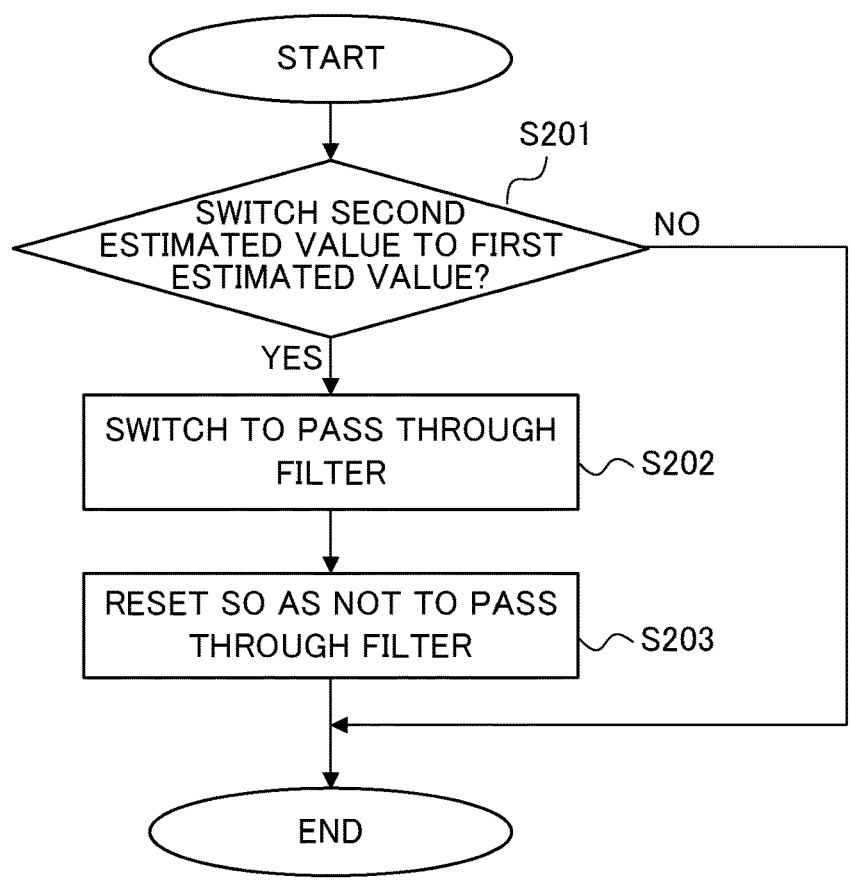
FIG. 15 is a flowchart illustrating a switching operation of the filter.

As described above, since the filter 110 is connected between the compensation amount generation unit 301 and the adder 90, it is possible to prevent discontinuity of the compensation amount. However, a selector switch 111 illustrated in FIG. 14 may connect the filter 110 between the compensation amount generation unit 301 and the adder 90 only when the selection unit 304 switches its output from the second estimated value to the first estimated value (the estimated load torque) or from the first estimated value to the second estimated value. After the switching is performed by the selection unit 304, the selector switch 111 may connect the compensation amount generation unit 301 and the adder 90 without via the filter 110. The selector switch 111 is switched on the basis of an instruction signal output by the absolute value comparing unit 3041 of the selection unit 304 illustrated in FIG. 4 and the like, and the selector switch 111 is switched when the selection unit 304 switches its output from the second estimated value to the first estimated value (the estimated load torque) or from the first estimated value to the second estimated value. FIG. 15 is a flowchart illustrating a switching operation of the filter 110. When the selection unit 304 switches the output from the second estimated value to the first estimated value in step S201 (step S201: YES), the selector switch 111 is switched so as to pass through the filter in step S202. After that, when discontinuity of the compensation amount is eliminated, the selector switch 111 is switched so as not to pass through the filter in step S203. A case in which the second estimated value is switched to the first estimated value by the selection unit 304 has been described in FIG. 15; when the selection unit 304 switches its output from the first estimated value to the second estimated value, it is determined in step S201 whether the selection unit 304 has switched its output from the first estimated value to the second estimated value.

While an example in which a filter or a filter and a selector switch are added to the configuration of the servomotor controller illustrated in FIG. 3 has been described, a filter or a filter and a selector switch may be added to the configuration of the servomotor controller illustrated in FIG. 12. In this case, a case in which the selection unit 304 switches its output from the second estimated value to the first estimated value (the estimated load torque) or from the first estimated value to the second estimated value and a case in which the selection unit 304 selects the second estimated value and the switch 310 switches its output from the second estimated value to the first estimated value (the estimated load torque) or from the first estimated value to the second estimated value may occur. When a filter and a selector switch are added, the selector switch 111 is switched on the basis of an instruction signal output by the absolute value comparing unit 3041 of the selection unit 304 illustrated in FIG. 4 or the position command speed determination unit 120. The selector switch 111 is switched when the selection unit 304 switches its output from the second estimated value to the first estimated value (the estimated load torque) or from the first estimated value to the second estimated value. Alternatively, the selector switch 111 is switched when the position command speed determination unit 120 causes the switch 310 to switch its output from the second estimated value to the first estimated value (the estimated load torque) or from the first estimated value to the second estimated value. The position command speed determination unit 120 may be replaced with a position command acceleration determination unit that receives the position command value created by the position command creation unit 10 to generate a command acceleration (a position command acceleration) of the position command value.

Fourth Embodiment

In the servomotor controller of the third embodiment, the filter 110 is provided on the output side of the position command compensation unit 31 in order to prevent discontinuity of the compensation amount. However, instead of providing a filter, the integrator 2021 of the torque command creation unit 202 illustrated in FIG. 10 may be overwritten so that the torque command value is continuous. In the present embodiment, the filter 110 may be provided on the output side of the position command compensation unit 31 as well as overwriting the integrator 2021. If the compensation amount for compensating the position command value is entered when the selection unit 304 switches its output from the second estimated value to the first estimated value (the estimated load torque) or from the first estimated value to the second estimated value, a change in the speed command value occurs. The integrator is overwritten so that the torque command value does not change due to a change in the speed command value, and the torque command value becomes continuous.

Figure 16:
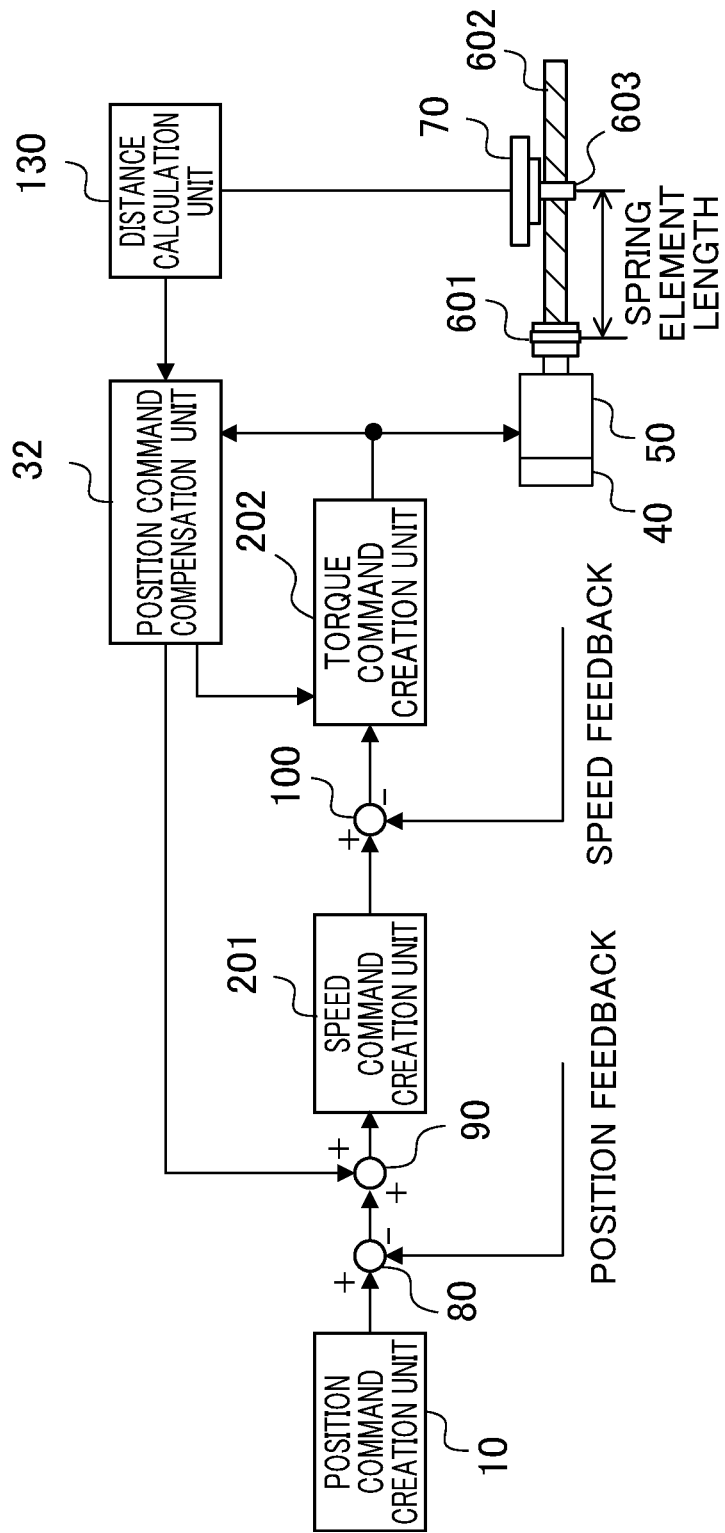
FIG. 16 is a block diagram illustrating a configuration of a servomotor controller serving as a fourth embodiment of the present invention.
Figure 17:
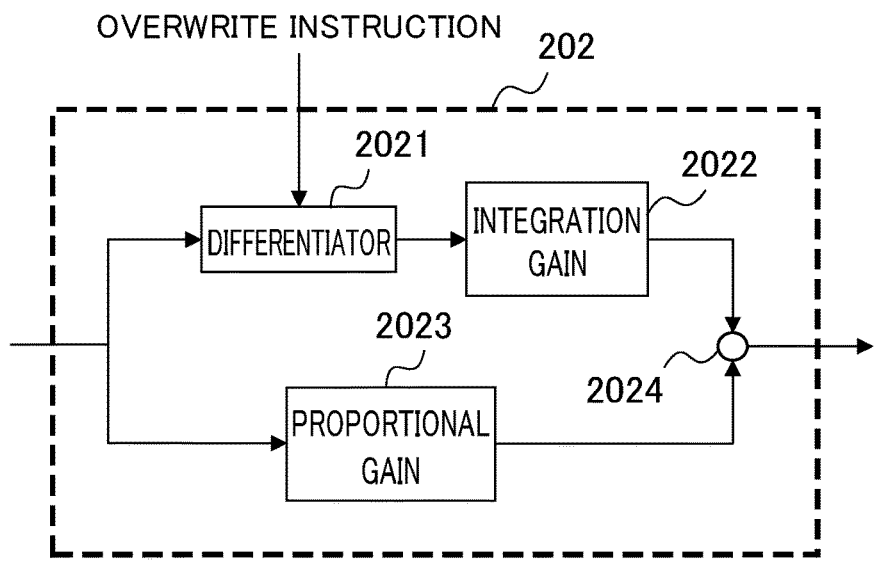
FIG. 17 is a block diagram illustrating a configuration of a torque command creation unit.

FIG. 16 is a block diagram illustrating a configuration of a servomotor controller serving as a fourth embodiment of the present invention. The configuration of the servomotor controller of FIG. 16 is the same as the configuration of the servomotor controller in FIG. 8 except that the absolute value comparing unit 3041 of the selection unit 304 illustrated in FIG. 4 sends an overwrite instruction for the integrator to the torque command creation unit 202, and the same constituent members are denoted by the same reference symbols, and the description thereof will be omitted. FIG. 17 is a block diagram illustrating a configuration of the torque command creation unit 202. As illustrated in FIG. 17, the overwrite instruction is sent to the integrator 2021.

The overwrite instruction is sent when the selection unit 304 illustrated in FIG. 3 and the like switches its output from the second estimated value to the first estimated value or from the first estimated value to the second estimated value. Overwriting of the integrator 2021 is performed as follows on the basis of the overwrite instruction. When Vcmd is defined as the speed command value, Vfb is defined as the detected speed, kp is defined as the proportional gain, and ki is defined as the integration gain, the torque command value TCMD is expressed by Formula 1.

$$TCMD = \Sigma(Vcmd - Vfb) \times ki + (Vcmd - Vfb) \times kp \quad \text{[Formula 1]}$$

When updating of the compensation amount restarts from a state in which updating of the compensation amount is stopped, the torque command value TCMD changes from TCMD (1) from TCMD (2).

$$TCMD(1) = \quad \text{[Formula 2]}$$
$$\Sigma(Vcmd(1) - Vfb(1)) \times ki + (Vcmd(1) - Vfb(1)) \times kp$$
$$TCMD(2) =$$
$$\Sigma(Vcmd(2) - Vfb(2)) \times ki + (Vcmd(2) - Vfb(2)) \times kp =$$
$$(TCMD(1) + (Vcmd(2) - Vfb(2))) \times ki +$$
$$(Vcmd(2) - Vfb(2)) \times kp$$

In the present embodiment, TCMD(1)+(Vcmd(2)−Vfb(2)) of the torque command value TCMD(2) is overwritten by the following Formula 3.

$$(TCMD(1) - (Vcmd(2) - Vfb(2)) \times kp)/ki \quad \text{[Formula 3]}$$

When this is done, the overwritten torque command value TCMD' (2) becomes the same as TCMD(1), and discontinuity of the torque command does not occur.

Figure 18:
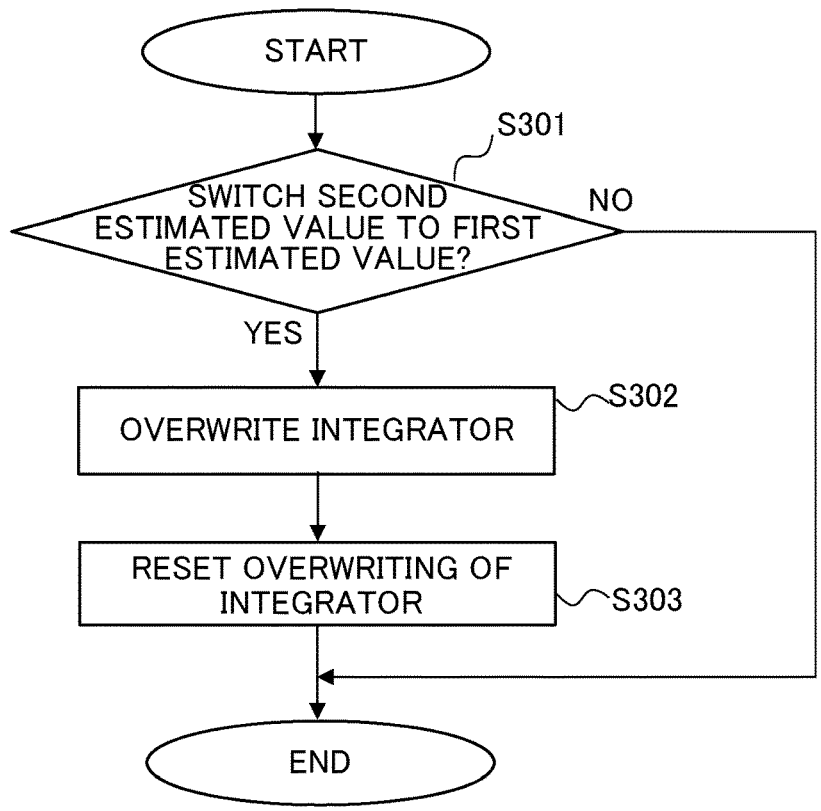
FIG. 18 is a flowchart illustrating a switching operation of an integrator.

FIG. 18 is a flowchart illustrating a switching operation of the integrator 2021. When the selection unit 304 switches its output from the second estimated value to the first estimated value in step S301 (step S301: YES), the integrator is overwritten in step S302. After that, when discontinuity of the compensation amount is eliminated, the overwriting of the integrator is reset in step S303. A case in which the selection unit 304 switches its output from the second estimated value to the first estimated value has been described in FIG. 18. However, when the selection unit 304 switches its output from the first estimated value to the second estimated value, it is determined whether the selection unit 304 has switched its output from the first estimated value to the second estimated value in step S301.

In the above-described embodiment, an example in which the absolute value comparing unit 3041 of the selection unit 304 sends an overwrite instruction for the integrator to the torque command creation unit 202 in the configuration of the servomotor controller of FIG. 8 has been described. However, the configuration of the present embodiment can be applied to a case in which the switch 310 and the position command speed determination unit 120 of the servomotor controller of FIG. 12 are added to the configuration of the servomotor controller of FIG. 8. In this case, a case in which the selection unit 304 switches its output from the second estimated value to the first estimated value (the estimated load torque) or from the first estimated value to the second estimated value and a case in which the selection unit 304 selects the second estimated value and the switch 310 switches its output from the second estimated value to the first estimated value (the estimated load torque) or from the first estimated value to the second estimated value may occur.

Figure 4:
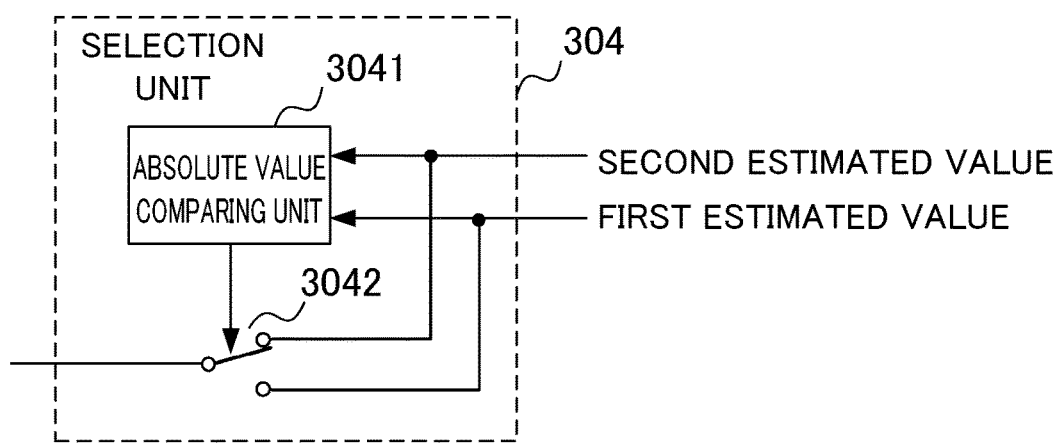
FIG. 4 is a block diagram illustrating a configuration of a selection unit illustrated in FIG. 3.

The integrator is overwritten on the basis of an instruction signal output by the position command speed determination unit 120 or the absolute value comparing unit 3041 of the selection unit 304 illustrated in FIG. 4. The integrator is overwritten when the selection unit 304 switches its output from the second estimated value to the first estimated value (the estimated load torque) or from the first estimated value to the second estimated value. Alternatively, the integrator is overwritten when the position command speed determination unit 120 causes the switch 310 to switch its output from the second estimated value to the first estimated value (the estimated load torque) or from the first estimated value to the second estimated value. The position command speed determination unit 120 may be replaced with a position command acceleration determination unit that receives the position command value created by the position command creation unit 10 to generate a command acceleration (a position command acceleration) of the position command value.

In the respective embodiments described above, compensation corresponding to rattling of a machine is performed as well as compensation of elastic deformation of a machine. Compensation corresponding to rattling of a machine occurs mainly in a low load torque range near reversal of motor rotation. Therefore, according to the present embodiment in which the position compensation amount is calculated using the second estimated value which is always larger than the first estimated value in the low load torque range when the switch 310 serving as a switching unit is not provided, it is possible to perform position compensation corresponding to rattling of a machine in which compensation is immediately entered during reversal of motor rotation.

In the respective embodiments, the predetermined constant value is basically set by measuring the force on the axis acting on the motor during a stop state of the machine. This set force, in a case of there being no disturbance (external force), corresponds to the static frictional force acting on the driven body during a stop state of the machine, and is a value no more than the maximum static frictional force. According to this setting, although there is some error depending on the stop state, even if estimation of the drive force is stopped and is set as the fixed value, it is possible to apply compensation corresponding to the elastic deformation amount produced due to this static frictional force during a stop state of the machine. Moreover, when a load larger than a large fixed value is applied, compensation is performed using the estimated load torque value (the first estimated value).

When the load torque under which the command speed or the command acceleration of the position command value is no more than a desired value is used as the second estimated value, compensation is performed using the second estimated value of the fixed value as the load torque until the absolute value of the first estimated value is larger than the absolute value of the second estimated value. At this time, the second estimated value is updated to a load torque estimated when the command speed or the command acceleration of the position command value exceeds the desired value and then the command speed or the command acceleration of the position command value becomes no more than the desired value. Even when either the predetermined constant value or the load torque value when the condition of the position command value was satisfied is used as the second estimated value, the second estimated value generates a dead zone in which compensation is not influenced by a change no more than a certain magnitude of torque. When such a switching unit as the switch 310 illustrated in FIG. 12 is provided, a dead zone occurs when the command speed or the command acceleration of the position command value becomes no more than the desired value.

In the respective embodiments, when the estimated load torque is small, the estimated load torque used for calculating an elastic deformation amount of a machine is clamped. By doing this, in the respective embodiments, it is possible to perform only compensation on the lost motion without applying a compensation amount which is not related to the operation of the servomotor. The compensation amount can keep dependency on the length of the ball screw.

Although embodiments of the present invention have been described above, the servomotor controller can realize a portion or the entirety of the functions thereof by hardware, software, or combinations thereof. Herein, realizing by way of software indicates the matter of being realized by a computer reading and executing programs. When the servomotor controller is realized by hardware, a portion or the entirety of the compensation amount generation unit 301, the force estimation units 302 and 303, the selection unit 304, the position command generation unit 10, and the motor control unit 20 of the servomotor controller can be configured by circuits represented by integrated circuits (IC) such as LSI (large Scale Integrated Circuit), ASIC (Application Specific Integrated Circuit), gate array, and FPGA (Field Programmable Gate Array), for example.

When the servomotor controller is realized by software, a portion or the entirety of the servomotor controller can be configured by a computer including a CPU and a storage unit such as a hard disk and ROM storing programs. Moreover, it is possible to execute operations of a portion or the entirety of the servomotor controller with the aid of programs by storing the information required for calculation in a second storage unit such as RAM and executing processing in accordance with a program following the block diagrams of FIGS. 3, 4, and 7 to 10 and the flowchart of FIG. 11, a program following the block diagram of FIG. 12 the block diagrams of FIGS. 13 and 14 and the flowchart of FIG. 15, and a program following the block diagrams of FIGS. 16 and 17 and the flowchart of FIG. 18. The programs can be read from an external storage medium such as CD-ROM, DVD or a flash memory on which the programs are recorded, into a storage unit such as a hard disk.

The programs can be stored using various types of computer-readable storage media and be provided to the computer. The computer-readable recording medium includes various types of tangible storage media. The computer-readable recording medium includes non-transitory computer-readable storage media. Examples of computer-readable recording media include magnetic media (for example, a flexible disk, a hard disk drive), magneto-optical recording media (for example, a magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although the respective embodiments and examples of the present invention have been described above, the present invention is not to be limited to the aforementioned respective embodiments and examples, and for one skilled in the art, it is possible to modify or change into various forms within a scope not departing from the gist of the present invention, based on the disclosure in the claims, and these modified examples or changed examples also fall under the scope of rights of the present invention.

EXPLANATION OF REFERENCE NUMERALS

10: Position command generation unit
20: Motor control unit
30, 31, 32: Position command compensation unit
40: Encoder
50: Servomotor
60: Connection mechanism
70: Table
301: Compensation amount generation unit
302, 303: Force estimation unit
304: Selection unit
310: Switch

What is claimed is:

1. A servomotor controller comprising:
   a servomotor;
   a driven body configured to be driven by the servomotor;
   a connection mechanism configured to connect the servomotor and the driven body and transfer power of the servomotor to the driven body;
   a position command generation unit configured to generate a position command value for the driven body;
   a motor control unit configured to control the servomotor using the position command value;
   a first force estimation unit configured to estimate a first force estimated value which is a drive force acting on the driven body at a connecting unit with the connection mechanism;
   a second force estimation unit configured to estimate a second force estimated value serving as a fixed value;
   a selection unit configured to compare an absolute value of the first force estimated value and an absolute value of the second force estimated value to output the first, or second force estimated value having the larger absolute value; and
   a compensation amount generation unit configured to generate a compensation amount for compensating the position command value generated by the position command generation unit on the basis of the first or second force estimated value output from the selection unit.

2. The servomotor controller according to claim 1, wherein
   the compensation amount generation unit uses, as the compensation amount, a sum of a product of the first or second force estimated value output from the selection unit and a first coefficient and a product of the first or second force estimated value output from the selection unit, a distance from the servomotor to the connecting unit, and a second coefficient.

3. The servomotor controller according to claim 1, wherein
   the second force estimated value is a value obtained by adjusting a drive force acting on the driven body to be estimated to a predetermined constant value having a sign corresponding to a direction of a position command created by the position command generation unit.

4. The servomotor controller according to claim 1, wherein
the second force estimated value is a predetermined constant value or a fixed value of the first force estimated value estimated by the first force estimation unit when a command speed or a command acceleration of the position command created by the position command generation unit is no more than a desired value.

5. The servomotor controller according to claim 1, further comprising:
a switching unit configured to switch its output from a value output from the selection unit to the first force estimated value estimated by the first force estimation unit when a command speed or a command acceleration of the position command value generated by the position command generation unit exceeds a desired value.

6. The servomotor controller according to claim 1, wherein
the compensation amount generated by the compensation amount generation unit is passed through a filter when the selection unit switches its output from the second force estimated value to the first force estimated value or from the first force estimated value to the second force estimated value.

7. The servomotor controller according to claim 5, wherein
the compensation amount generated by the compensation amount generation unit is passed through a filter when the switching unit switches its output from the second force estimated value to the first force estimated value or from the first force estimated value to the second force estimated value.

8. The servomotor controller according to claim 1, wherein
the motor control unit includes a speed command creation unit and a torque command creation unit,
the torque command creation unit includes an integrator that integrates at least a speed error, and
the integrator is overwritten when the selection unit switches its output from the second force estimated value to the first force estimated value or from the first force estimated value to the second force estimated value.

9. The servomotor controller according to claim 5, wherein
the motor control unit includes a speed command creation unit and a torque command creation unit,
the torque command creation unit includes an integrator that integrates at least a speed error, and
the integrator is overwritten when the switching unit switches its output from the second force estimated value to the first force estimated value or from the first force estimated value to the second force estimated value.

10. A servomotor control method for controlling a servomotor controller including:
a servomotor;
a driven body configured to be driven by the servomotor; and
a connection mechanism configured to connect the servomotor and the driven body and transfer power of the servomotor to the driven body, the method comprising the steps of:
generating a position command value for the driven body;
estimating a first force estimated value which is a drive force acting on the driven body at a connecting unit with the connection mechanism;
comparing an absolute value of the first force estimated value and an absolute value of the second force estimated value to select the first or second force estimated value having the larger absolute value;
compensating the generated position command value on the basis of the selected first or second force estimated value; and
controlling the servomotor using the compensated position command value.

11. The servomotor control method according to claim 10, wherein
a position command compensation value for compensating the position command value is a sum of a product of the selected first or second force estimated value and a first coefficient and a product of the selected first or second force estimated value, a distance from the servomotor to the connecting unit, and a second coefficient.

12. The servomotor control method according to claim 10, wherein
the second force estimated value is a value obtained by adjusting a drive force acting on the driven body to be estimated to a predetermined constant value having a sign corresponding to a direction of a position command.

13. The servomotor control method according to claim 10, wherein
the second force estimated value is a predetermined constant value or a fixed value of the first force estimated value estimated when a command speed or a command acceleration of the position command is no more than a desired value.

14. The servomotor control method according to claim 10, wherein
the selected force estimated value is switched to the first force estimated value when a command speed or a command acceleration of the generated position command value exceeds a desired value.

15. The servomotor control method according to claim 10, wherein
the compensation amount of the position command value is passed through a filter when the second force estimated value is switched to the first force estimated value or the first force estimated value is switched to the second force estimated value.

16. The servomotor control method according to claim 10, wherein
a speed command is created using the compensated position command value, a torque command is created using the created speed command, and the servomotor is controlled using the torque command,
the torque command is created using an integrator that integrates at least a speed error, and
the integrator is overwritten when the second force estimated value is switched to the first force estimated value or the first force estimated value is switched to the second force estimated value.

17. A non-transitory computer-readable recording medium encoded with a servomotor control program that causes a computer to execute servomotor control of a servomotor controller including:
a servomotor;
a driven body configured to be driven by the servomotor; and a connection mechanism configured to connect the servomotor and the driven body and transfer power of the servomotor to the driven body, the program causing the computer to execute processing of:

generating a position command value for the driven body;

estimating a first force estimated value which is a drive force acting on the driven body at a connecting unit with the connection mechanism;

comparing an absolute value of the first force estimated value and an absolute value of the second force estimated value to select the first or second force estimated value having the larger absolute value;

compensating the generated position command value on the basis of the selected first or second force estimated value; and controlling the servomotor using the compensated position command value.

* * * * *